Dec. 18, 1962 — L. J. CHARBONNEAU — 3,069,139
LUMBER SALVAGING TOOL
Filed Jan. 19, 1959 — 2 Sheets-Sheet 1
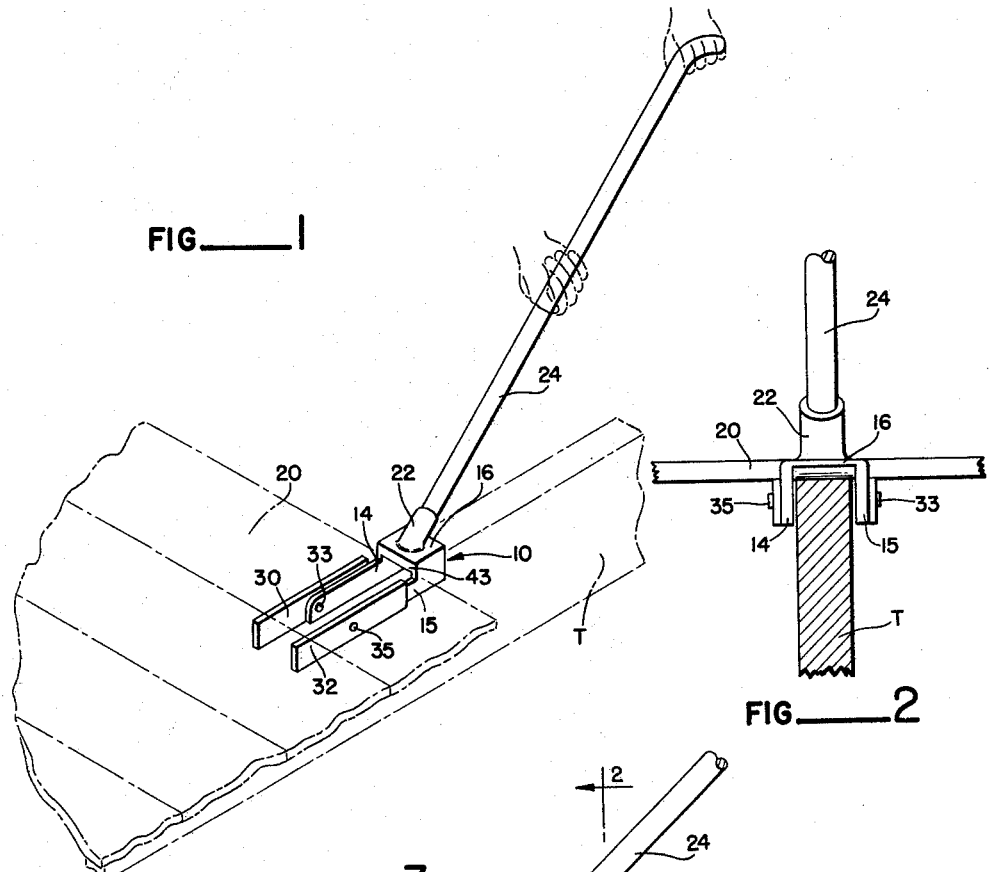
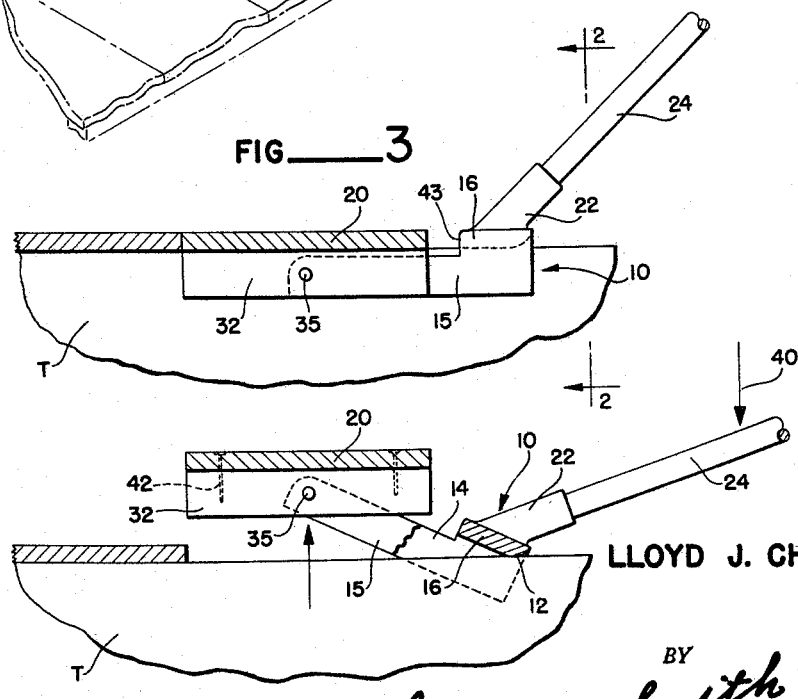
LLOYD J. CHARBONNEAU
INVENTOR.
BY Smith & Tuck Dec. 18, 1962 L. J. CHARBONNEAU 3,069,139
LUMBER SALVAGING TOOL
Filed Jan. 19, 1959 2 Sheets-Sheet 2
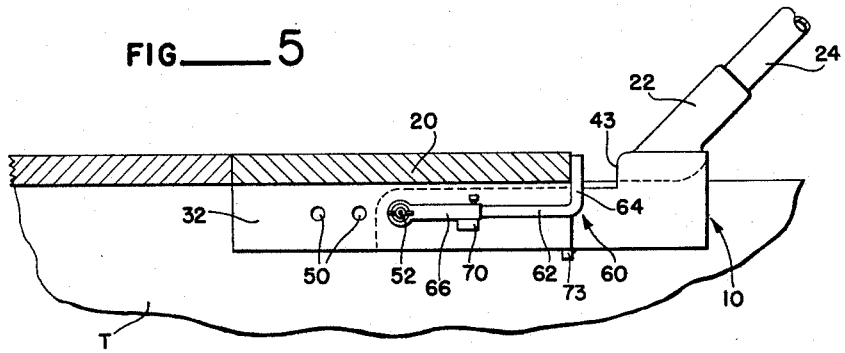
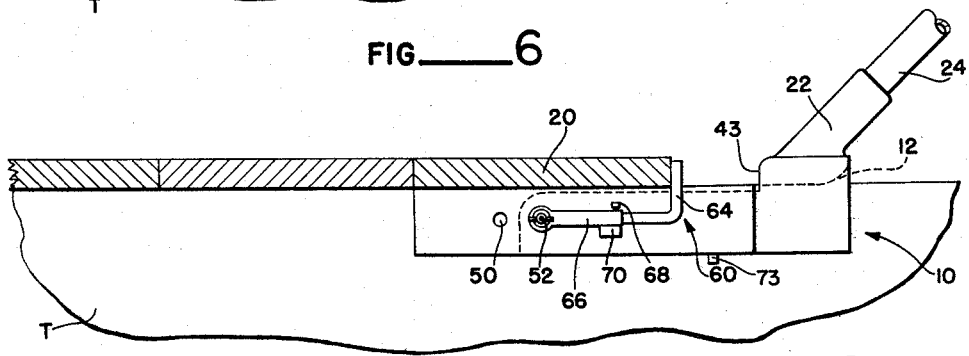
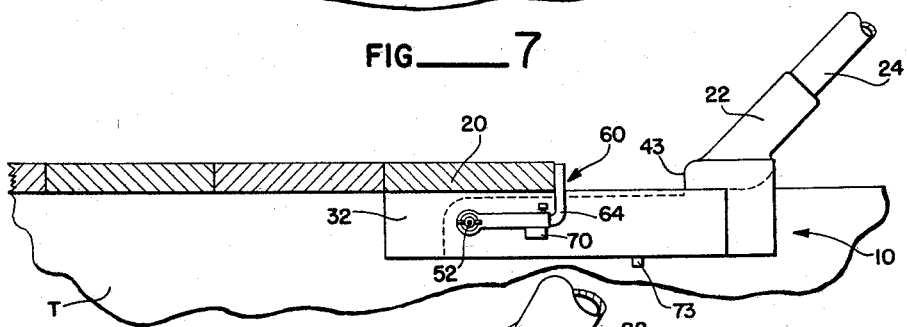
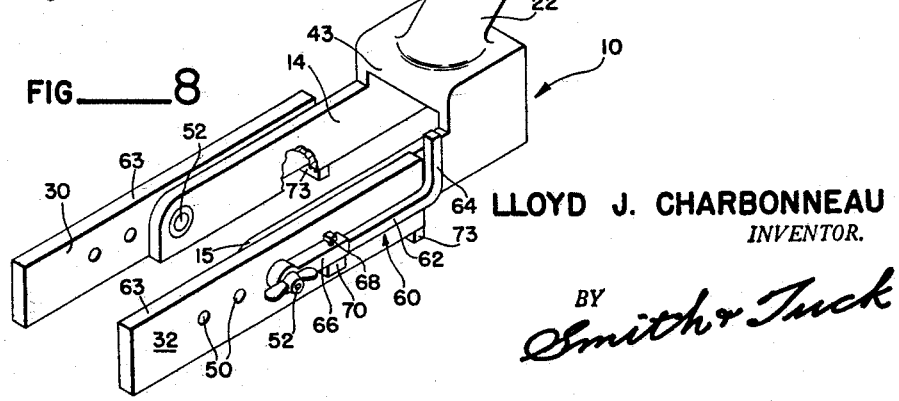
LLOYD J. CHARBONNEAU
INVENTOR.
BY
Smith & Tuck

United States Patent Office 3,069,139
Patented Dec. 18, 1962

3,069,139
LUMBER SALVAGING TOOL
Lloyd J. Charbonneau, Box 26, Coupeville, Wash.
Filed Jan. 19, 1959, Ser. No. 787,682
2 Claims. (Cl. 254—131)

This present invention relates to the general class of tools employed in the tearing down of old buildings and more especially to a lumber salvaging tool of the type employed in removing lumber, in the form of sheeting, siding, lath, flooring and planking and the like, that is nailed to spaced structural members such as studding, floor joists, ceiling joists, rafters.

The present high cost of building lumber has made it increasingly more desirable to salvage all usable lumber that has already served one period of use. It has been found that lumber that has served many years in a frame building, if it is carefully salvaged, is in many cases more desirable for reuse in new construction than the newer green lumber so often used in building construction. The need for the careful salvaging of lumber has brought about the development of many tools for this purpose and this present tool is of this general type.

A principal object of this present invention is to provide a lightweight tool which may be used with equal facility in removing nailed-in-place boards from spaced structural members as floors, studding or overhead ceiling joists or rafters.

A further object of this present invention is to provide a fulcrum and spaced lifting bars adapted for use with pivoted pressure bars which engage the lumber to be removed from structural members.

A further object of this invention is to provide adjusting means so that the pressure applied to the board, removing it from a structural member, may be equally disposed across the width of the board to the end that splitting of the boards will be largely avoided.

A further object of this invention is to provide gauge means so that the effort applied in lifting a board from a structural member can be very accurately adjusted to apply the pressure at the point transversely of the board where a minimum of damage will be done in removing the board.

Further objects, advantages and capabilities will be apparent from the description and disclosure in the drawings, or may be comprehended or are inherent in the device.

In the drawings:

FIGURE 1 is a perspective view illustrating the manner of using my tool and showing a structural member and boards secured to it in dashed lines to better illustrate the positioning of the tool in use.

FIGURE 2 is a vertical cross sectional view in fragmentary form, taken along the line 2—2 of FIGURE 3.

FIGURE 3 is a typical cross sectional view through boards applied to a structural member and showing the manner of engaging the same with my tool.

FIGURE 4 is a view similar to FIGURE 3 but illustrating the manner in which my device pulls the holding nails and lifts the board from the structural member.

FIGURE 5 is a view similar to FIGURE 3 showing in vertical sectional view the employment of my tool wherein a gauge is employed to position the tool, accurately, transversely of the board, the figure showing a relatively wide board such as might be used on the sheathing of a house wall or as a subfloor.

FIGURE 6 is a view similar to FIGURE 5 but illustrating a medium width board.

FIGURE 7 is a similar sectional view showing the device adjusted for use on a narrow board.

FIGURE 8 is a perspective view of the lower portion of my tool so as to better illustrate the arrangement of the coacting parts thereof.

Referring more particularly to the disclosure in the drawings, throughout which like reference characters indicate like parts, the numeral 10 designates generally the base unit of my device. This base unit is primarily the fulcrum member of the device with the fulcrum, or pivot edge proper, illustrated at 12 in FIGURE 4. Formed as part of member 10 are two spaced apart and parallel lifting bars 14 and 15 joined by a substantial cross member 16. These bars are disposed at right angles to the axis of pivot edge 12 and are spaced apart just sufficiently so that they can be employed in a straddled relationship with various structural timbers as T and be given positioning and support against tipping transversely of the timbers T. In the ordinary frame house timbers T may be floor joists or ceiling joists, which would normally be horizontal, or rafters or studding or the like, which would be either vertical or usually in the case of roof timbers slanting.

The various boards 20 are normally nailed to the structural members T and when it becomes desirable to remove the boards, from the member to which they are nailed, a very appreciable force is required and to this end a substantial handle securing means 22 is formed as part of base member 10 and into this a suitable handle 24 may be secured. It is normally desirable that the handle be secured at an angle to the normal operating plane of the tool or more properly the plane of the material to be removed. Forty-five degrees is normally a convenient angle but this may be varied in accordance with operational requirements. It is desirable that it be given adequate length so that there will be no difficulty in employing adequate force in the nail pulling operation. This force becomes considerable as quite often it is necessary to actually withdraw two or three or even more nails at the same time.

In the past, devices of this general order have been employed in which bars similar to the lifting bars 14 and 15 were employed in direct contact with the boards to be raised. This proved unsatisfactory in many cases, especially where the board had considerable width as does sheathing of a wall for instance. A feature I employ with my tool is to provide pressure bars as 30 and 32 which are pivotably secured as at 33 and 36 to the free ends of lifting bars 14 and 15 respectively.

Reference is now made to FIGURES 3 and 4 in which FIGURE 3 shows the pressure bar 32 in engagement with the bearing side of board 20 and with my tool in proper position with respect to the same. Pressure bar 30 is also similarly engaged but is hidden in these figures. In FIGURE 4 sufficient force has been employed to handle 24, in the direction indicated by arrow 40, so that my base member 10 is partially revolved about the pivot edge 12. This raises the pivot points 33 and 35. As base member is revolved about the pivot edge 12, the pivot points 33 and 35 carry with them the pressure bars 30 and 32 withdrawing nails 42 and lifting board 20 free of timber T. In this simplified form, it is necessary that the tool be accurately positioned by eye and that the pressure bars be properly positioned so that the pressure applied to the board will be equally distributed across its width. There is a single exception and that is, when the parts are so proportioned, that abutment 16 may be used to suitably position the tool. The positioning of the simplified tool is a difficult procedure and is rarely achieved by the average unskilled worker who usually is employed in this kind of salvage.

Reference is now made to FIGURES 5 through 8 in which means are provided so that my tool can be accurately adjusted to the width of the boards being removed and, when once adjusted, all the boards of this width can be easily removed by an unskilled or unattentive worker and with the minimum damage to the boards themselves. In FIGURE 8, it will be noted that the pressure bars 30 and 32 are provided with a plurality of pivot bolt openings 50. These may be arranged with different spacing, however, usually spaced an inch apart makes them most adaptable to the current standardized lumber sizes. In FIGURE 5, it will be noted that a relatively wide board 20 is to be raised and the hole 50 is selected, for the passage of pivot bolt 52, so that bars 30 and 32 will pivot about the midpoint of their lengths as they are raised by the lifting bars 14 and 15. In FIGURE 6 a narrower board is shown and, in this case, an adjustment is made to different openings 50 so that the pivot center established by bolts 52 will be disposed substantially at the center of the width of board 20. Bars 30 and 32 are disposed in spaced vertical planes parallel to the vertical plane of operation of lever 24. Referring to FIGURE 7, a still narrower board 20 is employed calling for a further adjustment of the pressure bars 30 and 32 so that the pivot point 52 will again be substantially in the center of the board to be lifted.

It is very desirable to provide a gauge arrangement so that the adjusted center of rotation of bars 30 and 32 may be accurately placed under the center of boards 20 and to achieve this I have provided a gauge member shown generally at 60. The gauge consists of a gauge rod 62 having a first portion that is normally disposed to the pressure or uppermost edge, as illustrated, of the pressure bars 30 and 32. At one end rod 62 is provided with an upturned portion 64 which is adapted to engage the free edge of the board 20 to be removed. The opposite end of rod 62 is straight and is disposed so that it may be slidably adjusted within the guide housing 66. When the desired position of gauge portion 64 is achieved, rod 62 is locked within the guide housing 66 by locking means normally a set screw indicated at 68. The guide housing 66 is preferably pivoted on pivot bolt 52 so that the upturned portion 64 can at all times be in contact with board 20 and tends to maintain the positioning of the pressure bars even after the board has been raised free of the timber, to which it was formerly secured. It is not essential in removing subflooring that housing 68 be pivotably secured to bolt 52 as subfloors are usually made of shiplap in which the joints overlap but do not interlock as does flooring or ceiling. Pivot bolts 52 may be placed in any one of a number of aligned pairs of holes 50 throughout the length of the pressure bars. The means, as illustrated, is a very desirable solution in that the upturned portion of the gauge means will be in a definite relationship to pressure bars 30 and 32, as the device is being put into use. I have further provided a stop member, as 70 formed as part of one of the co-acting pairs of pressure bars. It will be apparent, it is believed, that as the device is put into use and the upper margin, as 63 of the pressure bars, engages the board to be raised, that the pressure bars pivot on their common pivot bolt 52, until the upper edge of the bar is in engagement with board 20 throughout its width and this action will quickly position the upturned portion 64 of the gauge means. A wing nut is provided on bolt 52 to permit applying adjustable friction for holding gauge 60 in a preferred adjusted position.

In order to prevent pressure bars 30 or 32 from revolving about bolts 52, as the tool is put to use, and thus requiring manual repositioning, lugs 73 are welded to the under edge of the lifting bars 14 and 15 and extended outwardly sufficient to prevent the heavier rear ends of the pressure bars 30 and 32 dropping downwardly.

It is believed that it will be clearly apparent from the above description and the disclosure in the drawings that the invention comprehends a novel construction of a lumber salvaging tool.

Having thus disclosed the invention, I claim:

1. A tool for removing lumber nailed to spaced apart structural timbers and the like, comprising: two spaced apart and parallel lifting bars; a cross member joining said lifting bars and disposed at right angles to said lifting bars having one edge thereof disposed to form a fulcrum and a socket formed as part thereof for attaching an operating handle thereto; said operating handle disposed in a plane parallel to the spaced planes of revolution of said lifting bars and at an angle with respect to the same and disposed to be operable by downward pressure on the end of said handle; a separate pressure bar pivotably secured to each of said lifting bars; means for adjustably positioning the pivots for said pressure bars longitudinally thereof; said adjusting means for said pivots comprising a pivot bolt, said pressure bars having a plurality of pivot bolt receiving openings and a pivot bolt opening adjacent the end of each of said lifting bars; the ends of said pressure bars nearest said handle to be preponderantly heavier than the other ends in all adjusted positions; an adjustable gauge member secured to said tool, adapted to engage the free edge of a piece of lumber to be salvaged and position said pressure bars transversely of said piece of lumber; said gauge member comprising a gauge rod having a first portion adapted to be normally disposed parallel to one of said pressure bars and having an upturned portion adapted to engage the free edge of a piece of lumber to be salvaged and threaded positioning means for positioning and locking said gauge bar in various adjusted positions.

2. A lumber salvaging tool for removing boards from transversely disposed supporting timbers comprising: a fulcrum member having a base providing a pivot edge, two spaced apart and parallel lifting bars disposed at right angles to said pivot edge and means for attaching an operating handle thereto; the spacing of said lifting bars being just sufficient to straddle the supporting timbers; said operating handle disposed in a plane parallel to the spaced planes of revolution of said lifting bars and at an upwardly directed angle with respect to said lifting bars; pressure bars pivotably secured to said lifting bars; means for adjustably positioning the pivots for said pressure bars, longitudinally thereof and a gauge adapted to engage a piece of lumber to be salvaged and position said pressure bars transversely of said piece of lumber; lugs secured to the under side of said lifting bars to engage said pressure bars and position them parallel to said lifting bars; said gauge comprising a gauge rod having a straight first portion adapted to be disposed parallel to the engaging edge of one of said pressure bars and having a right angle portion adapted to engage the free edge of a piece of lumber to be salvaged; a guide housing for the straight end of said first portion, means secured to said housing for locking said gauge bar in various adjusted positions; said guide housing pivotably positioned on the side of one of said pressure bars and stop means secured to said one of said pressure bars to limit the downward movement of said gauge member with respect to said pressure bar.

References Cited in the file of this patent

UNITED STATES PATENTS

| | | |
|---|---|---|
| 757,915 | Guenther | Apr. 19, 1904 |
| 2,045,016 | Leary | June 23, 1936 |
| 2,195,667 | Baker | Apr. 2, 1940 |
| 2,745,447 | Studley | May 15, 1956 |
| 2,876,991 | Read | Mar. 10, 1959 |
| 2,929,609 | Graef | Mar. 22, 1960 |